US012761911B2

(12) United States Patent
Sekar et al.

(10) Patent No.: US 12,761,911 B2
(45) Date of Patent: Oct. 13, 2026

(54) SORTING VERSIONS OF SOFTWARE INSTANCES ON COMPUTING DEVICES IN A NETWORK

(71) Applicant: Ordr Inc., Santa Clara, CA (US)

(72) Inventors: Sakthi Dasan Sekar, Chennai (IN); Gnanaprakasam Pandian, Cupertino, CA (US); Deepak Cherian, Newark, CA (US); Gowri Sunder Ravi, Mountain View, CA (US)

(73) Assignee: Ordr Inc., Santa Clara, CA (US)

( * ) Notice: Subject to any disclaimer, the term of this patent is extended or adjusted under 35 U.S.C. 154(b) by 195 days.

(21) Appl. No.: 18/753,658

(22) Filed: Jun. 25, 2024

(65) Prior Publication Data

US 2025/0390294 A1 Dec. 25, 2025

(51) Int. Cl.

| | |
|---|---|
| ***G06F 9/44*** | (2018.01) |
| ***G06F 8/65*** | (2018.01) |
| ***G06F 8/71*** | (2018.01) |

(52) U.S. Cl.
CPC . *G06F 8/71* (2013.01); *G06F 8/65* (2013.01)

(58) Field of Classification Search
CPC .......................................................... G06F 8/71
USPC ........................................................... 717/170
See application file for complete search history.

(56) References Cited

U.S. PATENT DOCUMENTS

| | | | | |
|---|---|---|---|---|
| 10,248,414 B2 * | 4/2019 | Oberheide | .......... | G06F 9/44505 |
| 2003/0159135 A1 * | 8/2003 | Hiller | .................. | G06F 9/44536 717/122 |

* cited by examiner

*Primary Examiner* — Evral E Bodden
(74) *Attorney, Agent, or Firm* — Invoke

(57) ABSTRACT

Techniques for filter and sort versions of software instances executing on computing devices in a network are disclosed. The system receives an instruction to execute an operation on software instances that satisfy numerical criterion and non-numerical criterion. A standardizing function is applied to the numerical criterion to determine a standardized numerical criterion. The system accesses version number values corresponding to software instances on the computing devices in the network. By applying the standardizing function to numerical version numbers of the version number values, the system determines standardized numerical version numbers for the version number values. The system filters the standardized numerical version numbers based on the standardized numerical criterion. The system identifies software instances with (a) associated standardized numerical version numbers that meet the standardized numerical criterion and (b) non-numerical components that meet the non-numerical criterion. The system executes the operation on the software instances that meet the criteria.

21 Claims, 5 Drawing Sheets

Decimal Based Conversion

| Numerical Components 302 | Standard Form 304 | Standardized Versions 306 | Normalized Versions 308 | Sorted Normalized Versions 310 |
|---|---|---|---|---|
| 3.62.1 | | 03.0062.001 | 030062001 | 010191002 |
| 2.1.32 | | 02.0001.032 | 020001032 | 020001032 |
| 10.423.1 | | 10.0423.001 | 100423001 | 020023001 |
| 2.23.1 | ##.####.## | 02.0023.001 | 020023001 | 030062001 |
| 3.341 | | 03.0341.000 | 030341000 | 030341000 |
| 1.0191.2 | | 01.0191.002 | 010191002 | 070009000 |
| 7.9 | | 07.0009.000 | 070009000 | 100423001 |

*FIGURE 3A*

Hierarchical Relevance alpha / beta / rc / pre / date /batch

| Batch Versions 320 | Normalized Versions 322 | Sorted Normalized Versions 324 |
|---|---|---|
| 12.1.0 Android R27 | 1210 Android R27 | 1210 Android alpha |
| 12.1.0 Android R | 1210 Android R | 1210 Android alpha2 |
| 12.1.0 Android T20 | 1210 Android T20 | 1210 Android alpha20 |
| 12.1.0 Android A20 | 1210 Android A20 | 1210 Android beta |
| 12.1.0 Android B20 | 1210 Android B20 | 1210 Android RC |
| 12.1.0 Android alpha | 1210 Android alpha | 1210 Android R |
| 12.1.0 Android beta | 1210 Android beta | 1210 Android R27 |
| 12.1.0 Android RC | 1210 Android RC | 1210 Android R22 |
| 12.1.0 Android 20240410 | 1210 Android 20240410 | 1210 Android 20240410 |
| 12.1.0 Android alpha2 | 1210 Android alpha2 | 1210 Android A20 |
| 12.1.0 Android alpha20 | 1210 Android alpha20 | 1210 Android B20 |
| 12.1.0 Android 36 R22 | 1210 Android R22 | 1210 Android T20 |
| 12.1.0 Android | 1210 Android | 1210 Android |

*FIGURE 3B*

SORTING VERSIONS OF SOFTWARE INSTANCES ON COMPUTING DEVICES IN A NETWORK

TECHNICAL FIELD

The present disclosure relates to versions of software instances on computing devices in a network. In particular, the present disclosure relates to systems and methods for sorting the software versions.

BACKGROUND

The term "Internet of Things" (IoT) refers to a network of a wide variety of devices, such as computers, sensors, vehicles, home appliances, medical equipment, and/or surveillance equipment. Such devices may be referred to as "IoT devices."

IoT devices across a network may be executing countless software instances. Software instances of the same type, e.g., Windows, Zoom, Word, on different IoT devices may include different versions of the software. Versioning nomenclature for software versions, represented as a combination of one or more alpha-numeric versions strings, may be non-linear and heterogenous. This results in software version strings having a mix of numbers, dots, and text to denote major, minor, patch levels, and possibly additional qualifiers (e.g., alpha, beta).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3C illustrate examples for standardizing software versions; and

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. SOFTWARE VERSION SORTING ARCHITECTURE
3. SORTING SOFTWARE VERSIONS OF DEVICES ON A NETWORK
4. EXAMPLE STANDARDIZING OF SOFTWARE VERSIONS
5. PRACTICAL APPLICATIONS, ADVANTAGES & IMPROVEMENTS
6. COMPUTER NETWORKS
7. HARDWARE OVERVIEW
8. MISCELLANEOUS; EXTENSIONS

1. General Overview

One or more embodiments filter and sort versions of software instances executing on computing devices in a network. Initially, the system receives an instruction to execute an operation on software instances that satisfy a particular criterion. The criteria may include a numerical criterion and a non-numerical criterion. A standardizing function is applied to the numerical criterion to determine a standardized numerical criterion. The system accesses version number values corresponding to software instances on the computing devices in the network. By applying the standardizing function to numerical version numbers of the version number values, the system determines standardized numerical version numbers for the version number values of the software instances.

One or more embodiments filter the standardized numerical version numbers for the version number values of the software instances based on the standardized numerical criterion. The system identifies software instances with (a) associated standardized numerical version numbers that meet the standardized numerical criterion and (b) non-numerical components that meet the non-numerical criterion. The system executes the operation on the software instances that meet the criteria.

One or more embodiments sort the version number values based on the associated standardized numerical version numbers. A second sorting operation may be performed based on the non-numerical components of the version number values that meet the non-numerical criterion.

One or more embodiments generate training data for training an entity tagging model. The training data may include (a) actual values and (b) entity tags corresponding to the actual values. The system trains the entity tagging model using the training data and applies the trained entity tagging model to the version number values of the software instances to identify entities.

One or more embodiments described in this Specification and/or recited in the claims may not be included in this General Overview section.

2. Software Version Sorting Architecture

Figure 1:
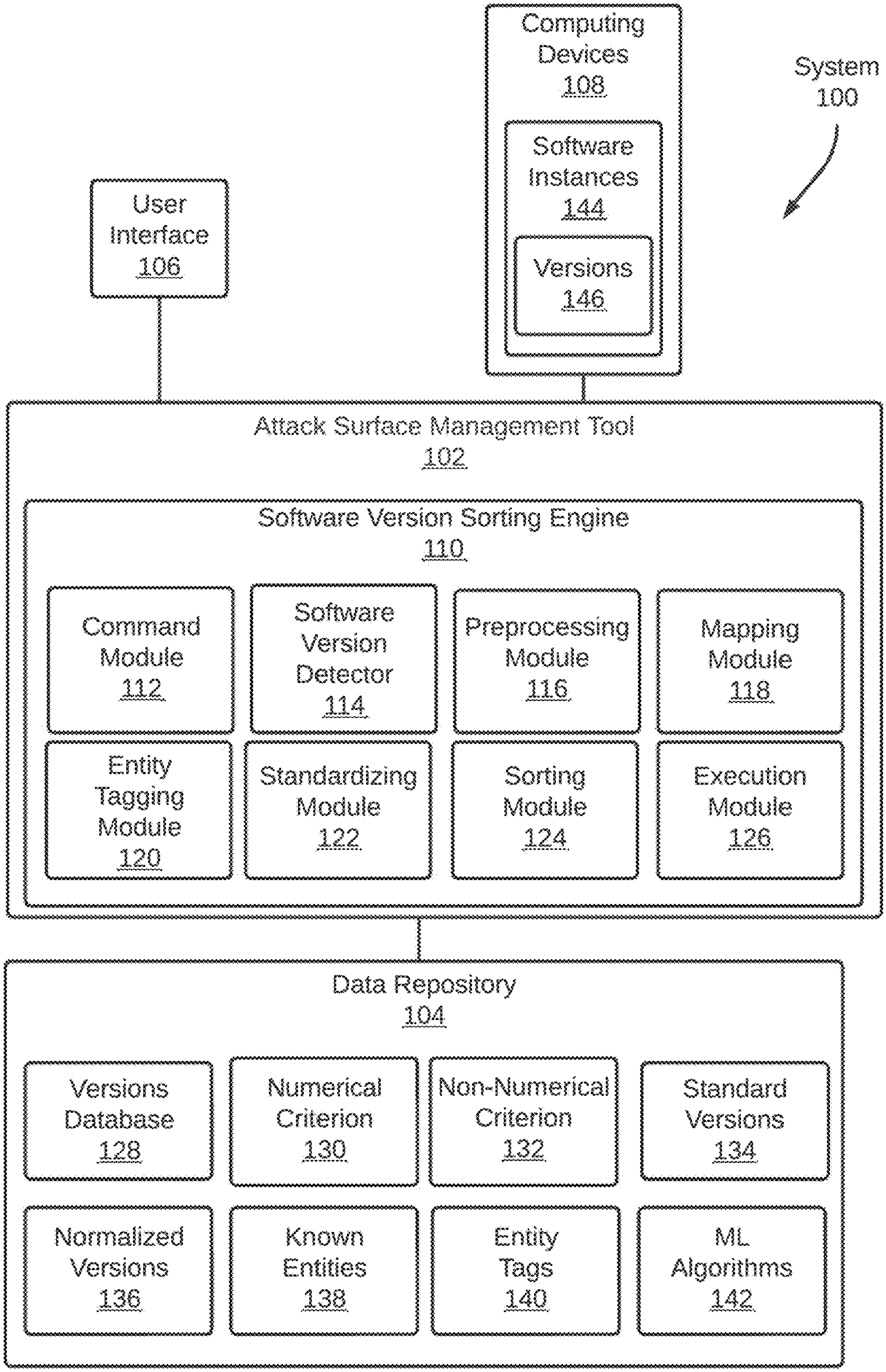
FIG. 1 illustrates a system in accordance with one or more embodiments.

FIG. 1 illustrates a system 100 in accordance with one or more embodiments. As illustrated in FIG. 1, system 100 includes an attack surface management tool 102, a data repository 104, a user interface 106, and one or more computing devices 108. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks."

In one or more embodiments, attack surface management tool 102 refers to hardware and/or software configured to perform operations described herein for filtering and sorting software versions 146 of software instances 144 on computing devices 108 in the system 100. Examples of operations for sorting software versions are described below with reference to FIG. 2.

In an embodiment, attack surface management tool 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, attack surface management tool 102, also known as a cyber asset attack surface management application (CAASM), is a tool or platform designed to identify, assess, and manage a cyber-attack surface of an organization. The attack surface refers to all the potential points through which an attacker can enter or exploit a network. Attack surface management tool 102 applications aim to provide visibility into an organization's digital assets, vulnerabilities, and potential attack vectors.

In one or more embodiments, the attack surface management tool 102 includes components for asset discovery, vulnerability assessment, components for risk prioritization, continuous monitoring, integration with security, compliance and reporting, incident response support, and attack surface mapping. Asset discovery tools scan the network to identify connected devices, systems, and assets. Assets include both traditional IT assets, like servers and workstations, as well as IoT devices, cloud resources, and other endpoints. Vulnerability assessment tools perform vulnerability scans to identify weaknesses and potential entry points for attackers. Vulnerability assessment tools often integrate with vulnerability databases to prioritize risks based on severity and exploitability. Attack surface mapping tools map out the organization's attack surface, visualizing the relationships between assets, networks, and potential attack paths. Mapping helps security teams to understand the scope of their exposure and prioritize mitigation efforts.

In one or more embodiments, attack surface management tool 102 includes a software version sorting engine 110 for identifying versions of software instances 144 on computing devices 108 in a network and sorting the versions 146 based on hierarchical relevance. The software version sorting engine 110 includes a command module 112, a software version detector 114, a preprocessing module 116, a mapping module 118, an entity tagging module 120, a standardizing module 122, a sorting module 124, and an execution module 126. As noted above, operations described with respect to one component may instead be performed by another component.

In one or more embodiments, command module 112 is software and/or hardware that receives commands from a user for executing various operations on a target set of software instances. Command module 112 may provide a user with an interface for identifying the target set of software instances. More particularly, command module 112 may include an interface for specifying a criteria, e.g., numerical or non-numerical criterion, of software, e.g., Windows, Android, for identifying the target set of software instances. Command module 112 may further include an interface for specifying the operation to be performed on the software instances that meet the criteria. The operations performed on the target set of software instances may include installing patches, updating software, or otherwise maintaining the software instances. The target set of software instances may include versions above, i.e., newer than, or below, i.e., older than, a target version of the software. The target set of software instances may include versions between two target versions of the software. The interface may have an auto-complete function that provides suggestions of version numbers for the user, e.g., known software versions and/or formatting. The interface may include a pulldown menu of known software versions, e.g., operating systems, conferencing tools, word processors, browsers, and mobile phone apps.

In one or more embodiments, software version detector 114 is a tool or component that identifies and compiles version strings of software instances executing on computing devices in system 100. Software version detector 114 identifies versions strings of software instances 144 on computing devices 108 of system 100. Software version detector 114 may detect the software versions using file metadata, registry configurations, API queries, and/or command line tools of the software instances. Software version detector 114 may analyze file properties such as the version number stored in the file's metadata. For example, Windows executables often contain version information. Software version detector 114 may read version information from system registries or configuration files where applications store their version data. Software version detector 114 may use system APIs to query installed software and retrieve version information. Software version detector 114 may execute commands or scripts to extract version information from the software itself, e.g., running '-version' or '-v' commands.

In one or more embodiments, preprocessing module 116 is a tool or component that preprocesses the version text. Preprocessing module 116 may address special characters, e.g., *, !, &, and abbreviations. For example, preprocessing module 116 may convert dashes and underscores into a standard format, e.g., dots. Preprocessing module 116 may convert alphabetic text to a consistent case, e.g., lowercase.

In one or more embodiments, mapping module 118 is a tool or component that establishes and maintains a database of software version formats and software versions as well as relationships between different software version formats and software versions. Mapping module 118 may track dependencies between different software versions. Mapping module 118 may map versions across different environments, e.g., workstation and mobile. Mapping module 118 may define rules for compatibility between different software versions, e.g., library 'A' version '1.2' corresponds to library 'B' version '3.4'. Mapping module 118 may map alias names or codes to specific versions (e.g., 'latest stable' to '1.4.2') or translate version numbers between different schemes or formats.

In one or more embodiments, entity tagging module 120, also referred to as a named entity recognition, is a tool or component that identifies, classifies, and annotates entities within a version string of software. Entities can include various types of information, e.g., nouns, delimiters, and decimal numbers. Entity tagging identifies numerical and non-numerical components of the version string, e.g., names and dates. Custom entity recognition recognizes domain-specific entities, such as software versions, product codes, or technical terms.

In one or more embodiments, entity tagging includes tokenizing the text into words or subwords. Entity tagging may include preprocessing steps, e.g., lowercasing, or removing stopwords. Features are extracted from text that will be used to train the model. Features can be words, word embeddings, part-of-speech tags, character-level features, etc. Entity tagging module 120 converts words or tokens into dense vectors (embeddings). Machine learning models, including, for example, recurrent neural networks like LSTM or GRU, or transformer-based models, such as BERT, may be used to capture the context of the tokens. The machine learning models include a tagging layer that assigns tags to each token. The model is trained using a labeled dataset, where each token is tagged with an entity type.

In one or more embodiments, standardizing module 122 ensures consistency and uniformity in how the software version numbers are represented. Standardizing module 122 may use a decimal based version that appends one or more decimal segments to a version number and/or pads decimal segments. Alternatively, standardizing module 122 may apply a logarithmic base function, a specialized dash function, or other standardizing function to the numerical component of the version numbers to create a standardized version number.

In one or more embodiments, the decimal based version for standardizing the numerical component of the version number includes appending one or more decimal segments to version numbers. One or more decimal segments are appended to numerical components that have less decimal segments than version numbers with a maximum number of decimal segments such that all the version numbers have the same number of decimal segments. Standardizing may also including padding, with leading zeros, any decimal segments having fewer digits than a number of digits in corresponding decimal segments of the other version numbers. The decimal based version for standardizing the numerical component of the version numbers ensures that the version numbers have the same number of decimal segments, and the corresponding decimal segments of the version numbers include the same number of digits.

In an example, "1.2.13" is a numerical component of a first version number, and "11.142" is a numerical component of a second version number. Initially, the numerical version numbers are reviewed to determine a maximum number of decimal segments. The first numerical component includes the maximum number of decimal segments—three (3). A decimal segment is added to the end of the numerical component of the second version number to provide the same number of decimal segments. Then, the decimal segments of the version numbers are compared to determine a maximum number of digits in the corresponding decimal segments. The maximum number of digits in the first decimal segment is two (2); the maximum number of digits in the second decimal segment is three (3); and the maximum number of decimal segments in the third decimal segment is two (2). The first decimal segment of the first version number is padded with "0", i.e., "01". Similarly, the second decimal segment of the first version number is padded with "00", i.e., "002". The second version number is appended with a third decimal segment formed by appending "00" after the second decimal segment, such that the third segment of the second version number includes the same number of digits as a third segment of the first version number. The standardized version number for the first version number is "01.002.13", and the standardized version number for the second version number is "11.142.00". In this example, the standardized version number may be simplified to a standard version, e.g., "0100213" and "1114200", respectively.

In one or more embodiments, sorting module 124 arranges the software version strings in a particular order. Sorting module 124 arranges software version strings using numerical components and non-numerical components of the software version string. The non-numerical components of the software versions are arranged based on hierarchical relevance. Sorting module 124 ensures that major versions are prioritized over minor versions and that minor versions take precedence over patch levels and additional qualifiers. Sorting module 124 sorts the software versions based on a predefined logic. The predefined logic may include knowledge of typical ordering in a software release lifecycle. The software versions may be arranged chronologically.

In one or more embodiments, execution module 126 is a tool or component for executing commands on the software instances meeting the provided criteria. The commands may include instructions to perform various operations, including installing patches or updates, modifying settings, and/or removing previously installed software.

In one or more embodiments, a data repository 104 is any type of storage unit and/or device (e.g., a file system, database, collection of tables, or any other storage mechanism) for storing data. Furthermore, data repository 104 may include multiple different storage units and/or devices. The multiple different storage units and/or devices may or may not be of the same type or located at the same physical site. Furthermore, a data repository 104 may be implemented or executed on the same computing system as attack surface management tool 102 and/or user interface 106. Additionally, or alternatively, data repository 104 may be implemented or executed on a computing system separate from attack surface management tool 102 and/or user interface 106. The data repository 104 may be communicatively coupled to attack surface management tool 102 and/or user interface 106 via a direct connection or via a network.

Information describing attack surface management tool 102 may be implemented across any of components within the system 100. However, this information is illustrated within the data repository 104 for purposes of clarity and explanation. Data repository 104 includes version database 128, numerical criterion 130, non-numerical criterion 132, standard versions 134, normalized versions 136, known entities 138, entity tags 140, and ML algorithms 142.

In one or more embodiments, version database 128 is a database of version numbers used to distinguish different releases of software products. Software versions may be denoted using a version string, i.e., a combination of numbers and letters, following a particular format. The version number may include one or more of the following components: major version, minor version, patch version, and build number. Major version represents significant updates or changes to the software that often introduce new features, functionalities, or architectural modifications. Changes in the major version number indicate that the software has undergone substantial revisions that might not be backward compatible with previous versions. Major version numbers may start from 1 and increment sequentially. The minor version indicates smaller updates, improvements, or bug fixes within a major version. These updates typically enhance existing features or address issues identified in the software. Minor version numbers are incremented sequentially and reset to zero when the major version number changes. The patch version, also known as the revision number, denotes minor updates, bug fixes, or security patches released to address specific issues or vulnerabilities in the software. Patch version numbers are usually incremented sequentially and reset to zero when the minor version number changes. Some software products include a build number that further distinguishes different builds of the same version. Build numbers typically indicate internal revisions or builds of the software and are not always visible to end-users.

In one or more embodiments, version numbers are denoted in a format like 'major.minor.patch', with each component separated by periods. For example, a version number of '2.1.0' indicates the second major version, first minor version, and no patches. If there are subsequent patches, the version number might become '2.1.1', '2.1.2', and so on. Software versioning schemes can vary between different developers and projects. Some software may use date-based versioning, alphanumeric identifiers, or other conventions to denote releases. The choice of versioning scheme depends on different factors, such as development practices, project requirements, and industry standards.

Versions of software that include both numerical and non-numerical components often use a combination of identifiers to denote different aspects of the release. The following are examples of software versions with their denotation.

1.0.0-alpha: Major version 1, pre-release alpha version
1.0.0-alpha.1: Minor revision of the pre-release alpha version
1.0.0-beta.2: Pre-release, second beta version after alpha
1.0.0-rc.3: Pre-release, third release candidate
1.0.0: First major release, stable version
1.2.0: Minor version update, indicating incremental improvements
2.0.0-dev: Major version 2, in development phase
2.1.0+build.45: Minor version 2.1 with build metadata
2.1.1: Patch level increment on minor version 2.1
3.0.0-alpha: Major version 3, early alpha stage
3.0.0-alpha.snapshot.20230915: Alpha snapshot of version 3, date-based identifier
3.0.0-beta.1+exp.sha.5114f85: Beta version of 3.0.0 with extended build metadata
3.0.0: Major version 3, stable release
2022.04.01: Date-based versioning, representing a release from Apr. 1, 2022
4.0.0+20241010: Major version 4, with date-based build metadata indicating a release or build on Oct. 10, 2024

The following are examples of known software versions with their denotation.

Microsoft Windows

Windows 10 Anniversary Update (Version 1607)
Windows 10 Creators Update (Version 1703)
Windows 10 Fall Creators Update (Version 1709)
Windows 10 April 2018 Update (Version 1803)

In Microsoft Windows versioning scheme, the non-numerical component (e.g., Anniversary Update, Creators Update) serves as a descriptive name for the release, while the numerical component (e.g., Version 1607) typically indicates the version number based on the year and month of release.

Ubuntu Linux:

Ubuntu 14.04 LTS (Trusty Tahr)
Ubuntu 16.04 LTS (Xenial Xerus)
Ubuntu 18.04 LTS (Bionic Beaver)
Ubuntu 20.04 LTS (Focal Fossa)

In Ubuntu's versioning scheme, the numerical component represents the release year and month (e.g., 14.04 for April 2014), while the non-numerical component is a codename based on an adjective and an animal name.

Apple iOS:

iOS 10 (Tens)
iOS 11 (Tens and Elevens)
iOS 12 (Peace)
iOS 13 (Yukon)

Apple's iOS versioning scheme typically uses numerical components to denote major versions (e.g., iOS 10, iOS 11) and non-numerical components as marketing names for the release.

Google Android:

Android 4.4 KitKat
Android 5.0 Lollipop
Android 6.0 Marshmallow
Android 7.0 Nougat In Google Android's versioning scheme, the numerical component represents the major version number, while the non-numerical component is a codename based on a dessert name.

Mozilla Firefox:

Firefox 57 Quantum
Firefox 89 Proton
Firefox 91 ESR (Extended Support Release)

In Mozilla Firefox's versioning scheme, the numerical component represents the major version number, while the non-numerical component is often a marketing or branding term for the release.

One or more versioning schemes include snapshots. A snapshot is a pre-release or intermediate version of software that captures the state of the software at a particular point in time. Snapshots are often used during the development process to provide a current view of the software's progress, enabling developers to test and evaluate recent changes without waiting for an official release. Snapshots may not be directly represented within the version number itself. Instead, snapshots are typically indicated through other means, such as the inclusion of build metadata or by appending special qualifiers to the version identifier.

In one or more embodiments, snapshots are denoted by build metadata, pre-release qualifiers, or using special naming conventions. Some versioning systems allow for the inclusion of build metadata that can include information, such as timestamps, commit hashes, or build numbers. Developers may append a snapshot identifier or timestamp to the version number to indicate that the text represents a snapshot build, e.g., '1.0.0+20220409', where '20220409' represents the date of the snapshot, or '2.1.0-alpha+abc1234', where 'alpha' indicates a pre-release version, and 'abc1234' is a build identifier. Pre-release identifiers, such as "alpha", "beta", or "snapshot", can be appended to the version number to indicate that it is a pre-release or snapshot version, e.g., '1.0.0-alpha' or '2.0.0-snapshot'. In some cases, software projects may adopt specific naming conventions to denote snapshot versions. For example, appending "-SNAPSHOT" to the version number is a convention used in Apache Maven projects to indicate snapshot builds, e.g., '1.0.0-SNAPSHOT' or '2.0.0-SNAPSHOT'.

In one or more embodiments, numerical criterion 130 for software versions are conditions or rules applied to numerical components of version strings to identify a target set of software instances. Numerical criterion 130 may be used to filter, compare, or evaluate the software versions. The numerical component may follow semantic versioning (major.minor.patch), date-based versioning, or similar versioning schemes. Numerical criterion 130 may identify a version number and include versions newer than and/or equal to the version number. Similarly, numerical criterion 130 may identify a version number and include all versions older than and/or equal to the version number. Numerical criterion 130 may also define a range between two version numbers, i.e., versions that fall between a first version number and a second version number. Numerical criterion 130 may be provided in a non-standard form and require standardizing.

In one or more embodiments, non-numerical criterion 132 for software versions are conditions or rules applied to non-numeric components of version strings to identify a target set of software instances. Non-numerical criterion 132 often include pre-release identifiers, build metadata, and/or specific suffixes that indicate the version's stage in the development lifecycle, such as "alpha", "beta", "rc" (release candidate), "SNAPSHOT", or custom tags, e.g., brand names.

In one or more embodiments, standard versions 134 of software versions are numerical components of software strings that have been standardized. As described above, numerical components of software versions may include multiple dots or decimals. Standardizing the numerical components of the software string allow the software strings to be arranged by hierarchical relevance. As detailed above, "1.2.13" is a numerical component of a first version number, and "11.142" is a numerical component of a second version number. The standardized version number for the first version number is "01.002.13", and the standardized version number for the second version number is "11.142.00". The standardized version number may be simplified to the standard version, e.g., "0100213" and "1114200".

In one or more embodiments, the numerical component of a first version number may include more decimal segments than the numerical component of a second version number, e.g., "1.2.13" and "2.254". As discussed above, additional decimal segments may be appended to the numerical component of the second version number to ensure the same number of decimal segments between the first and second version numbers. The additional decimal segments include the same number of digits as in the decimal segment of the first version number. Each digit of the additional decimal segment is represented by a "0". In this manner, the standardized versions of the example first and second versions numbers are "1.002.13" and "2.254.00". The standardized version numbers may be simplified to "100213" and "225400", respectively.

In one or more embodiments, normalized versions 136 of software versions are the standard versions 134 of the software versions, i.e., standardized numerical component of the software versions, converted to an integer and combined with the non-numerical component of the software version. Converting the standard versions 134 to integers may include removing decimals. Normalized versions 136 are used to sort the version numbers of the software instances.

In one or more embodiments, known entities 138 are identifiable components or elements within a version string that follow specific patterns or conventions. Known entities 138 help to understand, compare, and manage different versions of software systematically. Known entities 138 in version numbers include major version, minor version, patch version, pre-release identifier, and build metadata. Known entities 138 may include delimiters. Delimiters in a version string are characters or symbols used to separate different components within the version identifier. Delimiters help in parsing and interpreting the version information correctly. Delimiters may include periods, hyphens, underscores or dashes, plus signs, spaces, colons or slashes, and parentheses. Periods separate different components of the version, such as major, minor, patch, and build numbers.

In one or more embodiments, entity tags 140 are labels or tags of different components of a version string. Entity tags 140 are used to identify and categorize the components for better analysis, comparison, and management. Entity tags 140 may include nouns, numbers, decimal numbers, and delimiters. Nouns are identifiers, such as pre-release tags or build metadata. Numbers and decimal numbers represent numerical parts of the version string. Delimiters are characters that separate different components of the version string.

In one or more embodiments, a machine learning algorithm 142 is an algorithm that can be iterated to train a target model f that best maps a set of input variables to an output variable. In particular, a machine learning algorithm 142 is configured to generate and/or train entity tagging model.

A machine learning algorithm is an algorithm that can be iterated to train a target model f that best maps a set of input variables to an output variable using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm that in turn updates the target model f.

A machine learning algorithm 142 generates a target model f such that the target model f best fits the datasets of training data to the labels of the training data. Additionally, or alternatively, a machine learning algorithm 142 generates a target model f such that when the target model f is applied to the datasets of the training data, a maximum number of results determined by the target model f matches the labels of the training data. Different target models are generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, user interface 106 refers to hardware and/or software configured to facilitate communications between a user and attack surface management tool 102. User interface 106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 106 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, user interface 106 is specified in one or more other languages, such as Java, C, or C++.

In one or more embodiments, computing devices 108 of the system 100 perform various operations. The computing devices 108 may be of the same type or of different types from each other. The computing devices 108 may be used for the same purpose or different purposes. The computing devices 108 may operate in the same mode or different mode from each other. Peripherals (e.g., modems, routers, storage devices) may be connected to one or more of the computing devices 108. The computing devices 108 may include any number of software instances 144. The software instances 144 may include operating systems, e.g., Windows, Ubuntu Server, Android 11, conferencing tools, e.g., Zoom, FaceTime, word processors, e.g., Microsoft Word, database management, e.g., MySQL 8.0, browsers, e.g., Chrome, Safari, and mobile phone apps, e.g., Waze. The software instances 144 include corresponding versions 146. As described in detail above, normalized versions 136 of the software instance 144 may include numerical and non-numerical components in a variety of formats.

3. Sorting Software Versions of Devices on a Network

Figure 2:
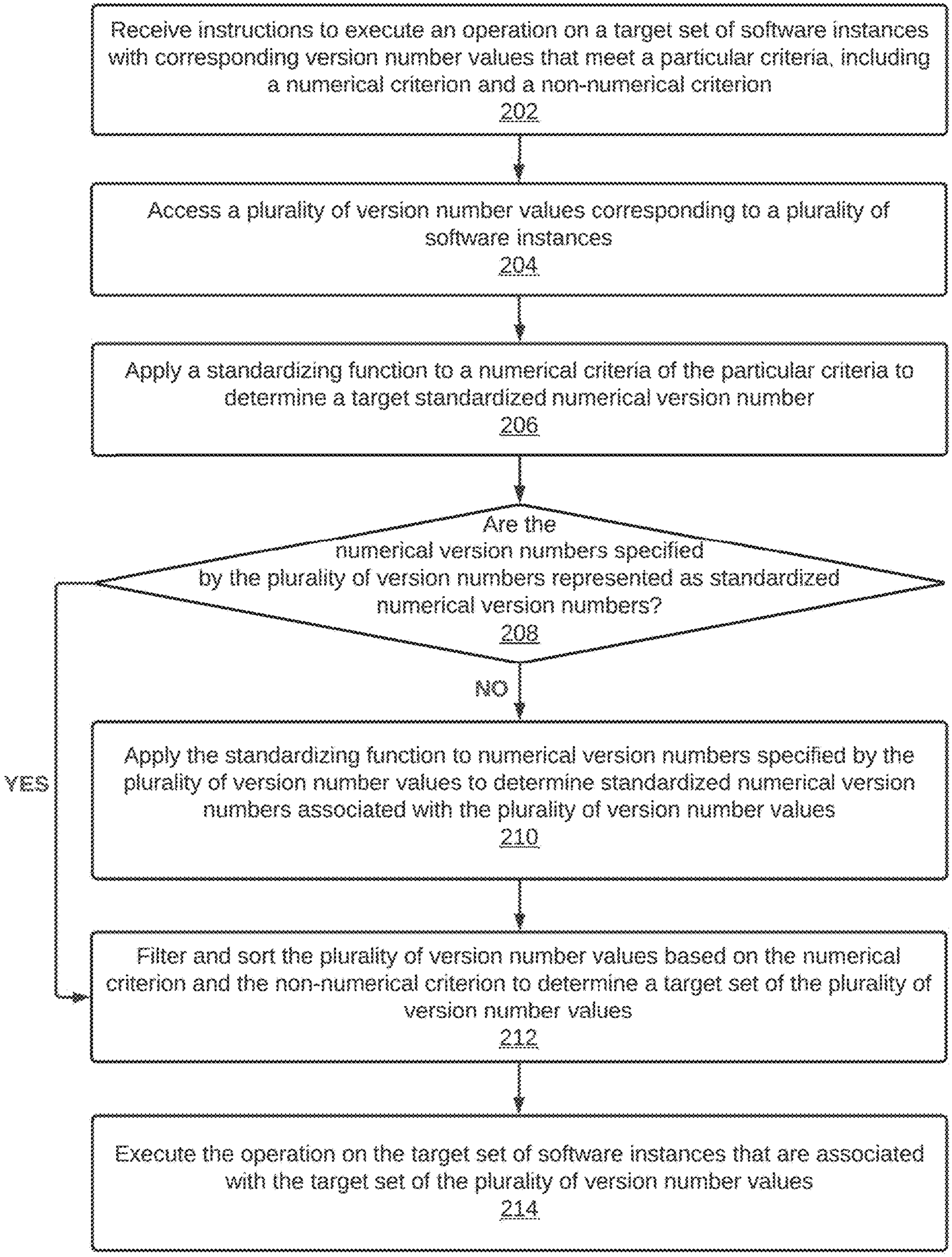
FIG. 2 illustrates an example set of operations for sorting software versions of computing devices in a network in accordance with one or more embodiments.

FIG. 2 illustrates an example set of operations for filtering and sorting software instances executing on computing devices in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

One or more embodiments receive instructions to execute an operation on a target set of software instances with corresponding version number values that meet a particular criteria, including a numerical criterion and a non-numerical criterion (Operation 202). A user provides instructions, through a user interface, for execution of an operation, e.g., installing a patch, on a target set of software instances. The target set of software instances includes all software instances of a particular operating system or program, e.g., Windows, Zoom, that have a version number value that meets the criteria provided to system. A user provides the criteria in the form of a numerical criterion and a non-numerical criterion. The criteria includes a version number and if the operation is to be executed on software instances with matching version numbers, on software instances of newer version numbers, and/or on software instances of older version numbers. The criteria may also include an additional version number for generating a range of version numbers between the two version numbers.

One or more embodiments access a plurality of version number values corresponding to a plurality of software instances (Operation 204). The system scans the network and identifies the version number values for all software instances of the particular operating system or program on the computing devices in the network. The system may detect the software versions of software instances using file metadata, registry configurations, API queries, and/or command line tools of the software instances.

One or more embodiments apply a standardizing function to a numerical criteria of the particular criteria to determine a target standardized numerical version number (Operation 206). Standardizing the numerical criteria includes identifying the numerical components of the particular criteria and the plurality of version numbers. Identifying the numerical component of the particular criteria may be performed using a lookup table or other mappings of software version numbers. Alternatively, identifying the numerical component of the particular criteria may include applying an entity tagging model to the version number value.

In one or more embodiments, the numerical components of the numerical criteria and the plurality of version numbers may include decimal segments. The decimal segments may be denoted by dots, dashes, lashes, or in any other manner. The numerical components may be preprocessed prior to standardizing. Preprocessing may include converting dashes, dots, and other characters to decimals. Preprocessing provides conformity between the version numbers.

In one or more embodiments, the applying the standardizing function includes analyzing the numerical component of the version numbers in the plurality of software instances to determine common features. Common features may include a maximum number of decimal segments for the software versions and/or a maximum number of digits in each of the decimal segments. When the numerical components of the version number of the criteria includes less than the maximum number of decimal segments, a decimal segment of zeros is appended to the numerical component. The number of digits in the appended decimal segment is the same as the number of digits in the corresponding decimal segment of the version numbers of the plurality of software instances with the maximum number of digits. Each digit is represented with a zero. Similarly, the decimal segments of the numerical component of the version number of the criteria are padded with leading zeros when the number of digits in the decimal segment is less than the maximum number of digits in the corresponding decimal segments of the version numbers of the plurality of software instances.

One or more embodiments determine if the numerical version numbers specified by the plurality of version numbers are represented as standardized numerical version numbers (Operation 208). Determining if the numerical version numbers specified by the plurality of version numbers are represented as standardized numerical versions may include identifying the number of decimal segments in each of the numerical version numbers of the plurality of version numbers and the number of digits in each of the segments. Standardized numerical versions of the numerical version numbers include numerical version numbers with same number of decimal segments for the plurality of version numbers and corresponding decimal segments with the same numbers of digits.

One or more embodiments apply a standardizing function to numerical version numbers specified by the plurality of version number values to determine standardized numerical version numbers associated with the plurality of version number values (Operation 210). When the numerical version numbers specified by the plurality of version numbers are not standardized version numbers, the standardizing function is applied to the numerical version numbers. As described above, the standardizing function may include appending one or more decimal segments to the numerical version number to ensure the same number of decimal segments between numerical version numbers. The standardizing function may include padding the decimal segments of the numerical version numbers with leading zeros to ensure conformity between corresponding decimal segments of the numerical version numbers. When the version number value of a version number includes more than one string of numerical components, the additional numerical components may be ignored.

One or more embodiments filter the plurality of version number values based on the numerical criterion and the non-numerical criterion to determine a target set of the plurality of version number values (Operation 212). Initially, the standardized version numbers are combined with the non-numerical components to form normalized version numbers. The normalized version numbers are sorted using the numerical component. The numerical components may be sorted using various algorithms, including, for example, bubble sort, quick sort, or merge sort. The normalized version numbers are then sorted using the non-numerical components.

Filtering the plurality of version number values includes identifying the numerical version numbers that meet the numerical criterion of the particular criteria. The standardized numerical versions of the plurality of version number values are compared to the standardized numerical version of the numerical criterion of the version number of the criteria. The standardized numerical versions of the plurality of version number values that meet the numerical criterion are identified as potential versions of the target set.

In one or more embodiments, version number values that meet the numerical criterion may be sorted using the non-numerical component. The version number values are sorted based on a hierarchical relevance. Pre-release versions, indicated by labels, such as "alpha", "beta", and "rc", are typically considered first, then the corresponding release versions are considered next. Labels, such as patch, build, and snapshot, are then processed, followed by any additional text, brand names, etc., in alphabetical order. The non-numerical components are compared to the non-numerical criterion. The version number values that meet the non-numerical component are identified as being in the target set of version number values.

One or more embodiments execute the operation on the target set of software instances that are associated with the target set of the plurality of version number values (Operation 214). The software instances associated with the target set of the plurality of version number values are then updated or otherwise modified.

4. Example Standardizing of Software Versions

A detailed example is described below for purposes of clarity. Components and/or operations described below should be understood as one specific example that may not be applicable to certain embodiments. Accordingly, components and/or operations described below should not be construed as limiting the scope of any of the claims.

Figure 3C:
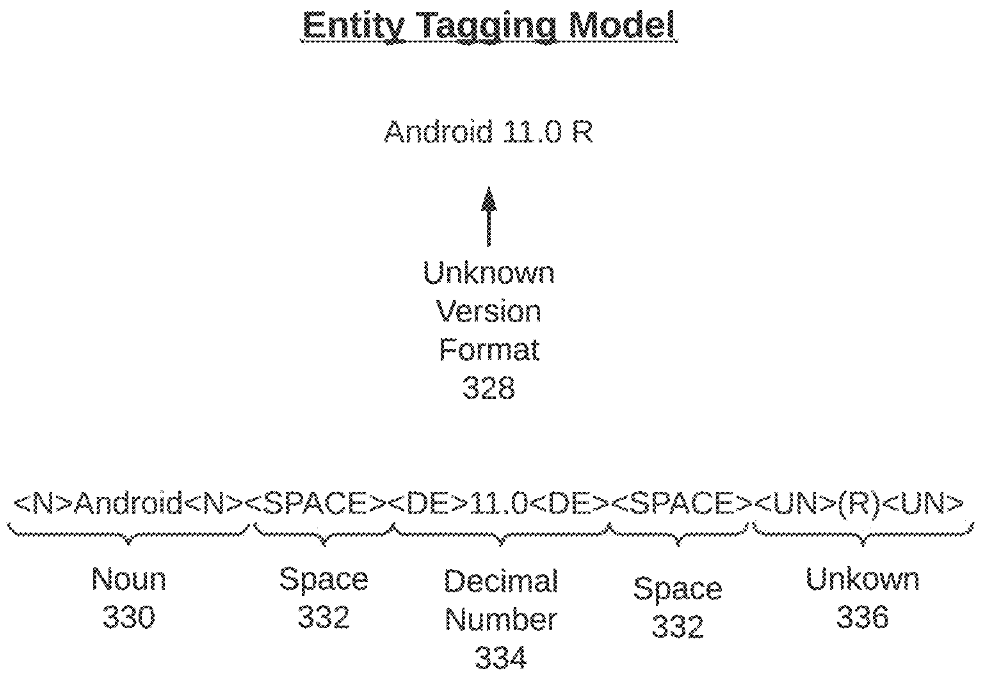

FIGS. 3A-3C illustrate methods of standardizing software versions.

FIG. 3A illustrates a decimal based conversion of numerical components of version numbers. Initially, the version number values of software instances are retrieved and the numerical components 302 are identified. The numerical components 302 may be identified using an entity tagging model. The numerical components 302 are compared and analyzed to determine a standard form 304. As shown, the standard form 304 includes the maximum number of decimal segments of any of the version numbers and the maximum number of digits in any version number for each of the decimal segment. The maximum number of decimal segments for any of the version numbers is three (3); the maximum number of digits in the first decimal segment of any of the version numbers is two (2); the maximum number of digits in the second decimal segment is four (4); and the maximum number of digits in the third decimal segment is three (3). Thus, the standard form 304 includes "##.####.###".

Standardizing the numerical components 302 includes appending one or more decimal segments to version numbers with numerical components having less than three decimal segments. Standardizing the numerical components 302 also includes padding, with one or more zeros (0) version numbers with i) a first decimal segment having less than two (2) digits, ii) a second decimal segment having less than four (4) digits, and/or iii) a third decimal segment having less than three (3) digits. The result of standardizing the numerical components 302 is standardized versions 306.

The standardized versions 306 may be converted to normalized versions 308, i.e., integers, by removing the decimals. The normalized versions 308 may then be sorted to create sorted normalized versions 310.

FIG. 3B illustrates sorting of version number values based on non-numerical components. Initially, the system identifies batch versions 320 of software instances operating on a network. As shown, the batch versions 320 include version number values having the same numerical component and different non-numerical components. The numerical component of the batch versions 320 may be converted to a standardized form for combining with the non-numerical components to generate normalized versions 322.

The normalized versions 322 may then be sorted based on hierarchical relevance to provide sorted normalized versions 324. Hierarchical relevance may vary between applications and programs. As shown, the non-numerical components are listed in the following order: alpha, beta, release candidates, pre-release candidates, date, batch, and empty. Non-numerical components of the same type and with different associated numbers, e.g., alpha, alpha 2, alpha 20, are arranged in numerical order.

FIG. 3C illustrates an entity tagging model. Initially, a version value number having an unknown version format 328 is identified. A trained entity tagging model is applied to the version value number to identify the various entities that comprise the version value number. The first text component is identified or tagged as noun 330, the second text component is identified or tagged as a decimal number 334, and a third text component is identified as unknown 336. Between the first text component and the second text component and between the second text component and the third text component is identified a space 332.

5. Practical Applications, Advantages & Improvements

The presently disclosed systems and methods of filtering and sorting software accommodate a wide range of versioning schemes, thereby providing high adaptability to diverse software ecosystems encountered in different environments. By enabling precise and context-aware sorting of software versions, the systems and methods significantly enhance the management and prioritization of software assets, contributing to more effective vulnerability assessment and patch management processes. The ability of the systems and methods to adapt to various versioning formats and to handle complex version strings that defy conventional sorting logic offers a robust solution to a pervasive challenge in cybersecurity asset management.

Precise version sorting allows for effective vulnerability assessments and patch management processes by accurately identifying the software assets that are outdated or potentially vulnerable. Precise version sorting also allows for the prioritization of updates and patches, thereby enhancing the overall security of managed assets.

6. Computer Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
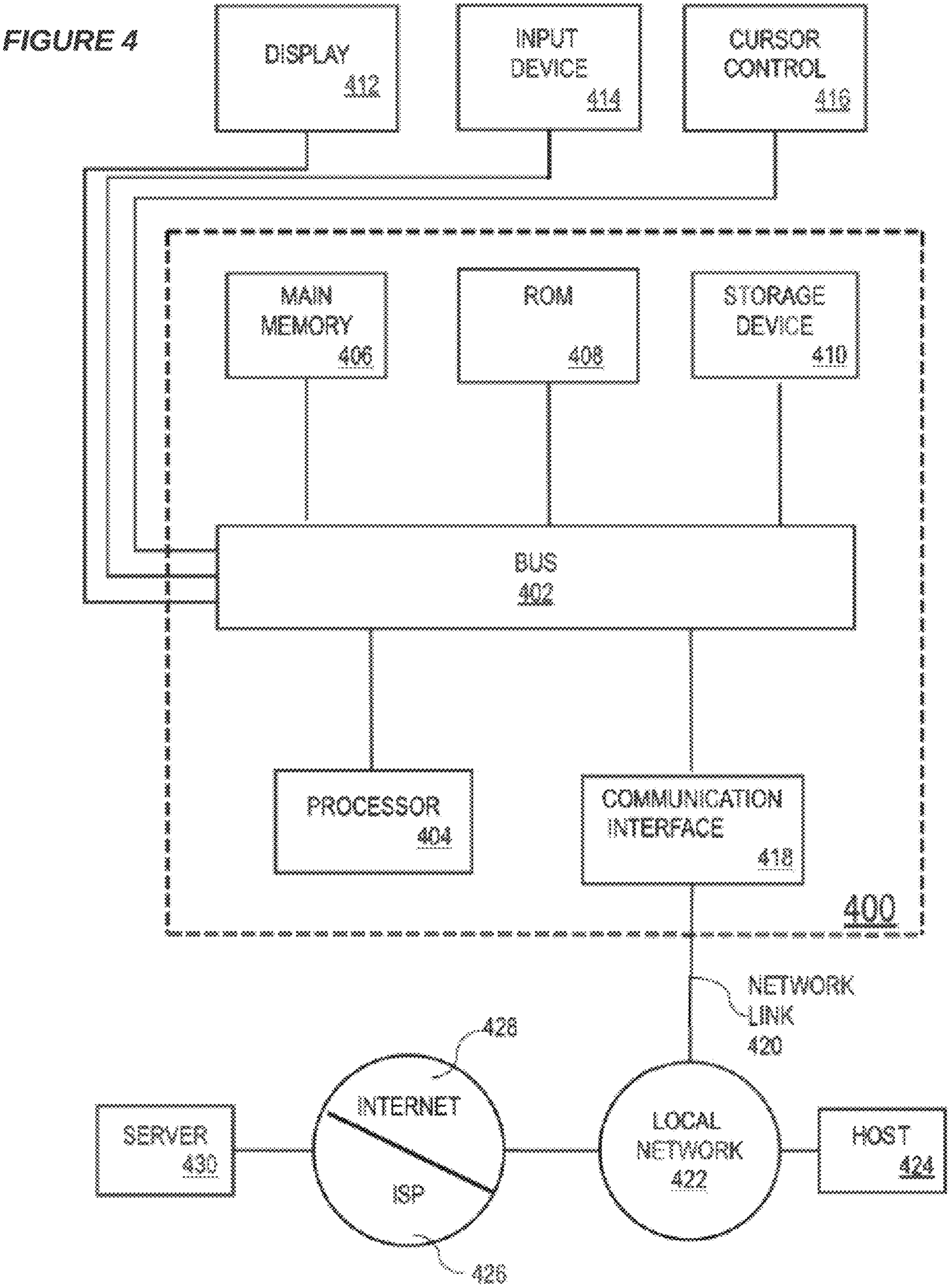
FIG. 4 shows a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which when executed by one or more hardware processors, causes performance of operations comprising:

receiving an instruction to execute an operation on a target set of software instances with corresponding version number values that meet a particular criteria, wherein the particular criteria defines a first numerical criterion and a non-numerical criterion;

applying a standardization function to a numerical version number specified by the first numerical criterion to determine a second numerical criterion specifying a target standardized numerical version number;

accessing a plurality of version number values corresponding respectively to a plurality of software instances;

applying the standardization function to numerical version numbers specified by the plurality of version number values to determine standardized numerical version numbers associated with the plurality of version number values;

filtering the plurality of version number values based on the second numerical criterion and the non-numerical criterion to determine a target set of the plurality of version number values that meet the second numerical criterion and the non-numerical criterion, wherein version number values, of the plurality of version number values, with (a) associated standardized numerical version numbers that meet the second numerical criterion and (b) non-numerical components that meet the non-numerical criterion are included in the target set of the plurality of version number values;

including software instances, of the plurality of software instances, that are associated with one of the target set of the plurality of version number values in the target set of software instances; and executing the operation on the target set of software instances.

2. The one or more non-transitory computer readable media of claim 1, wherein the operations further comprise:

executing a first sorting operation on the plurality of version number values based on associated standardized numerical version numbers;

subsequent to the first sorting operation, executing a second sorting operation on a subset of the plurality of version number values, with the same associated standardized numerical version numbers, based on the non-numerical components of each of the subset of the plurality of version number values.

3. The one or more non-transitory computer readable media of claim 2, wherein the second sorting operation comprises:

identifying pre-release versions, release versions, and patches associated with version number values of the subset of the plurality of version number values;

arranging the subset of the plurality of version number values with any pre-release versions listed in alphabetical order, followed by any release versions listed in alphabetical order, followed by any patches listed in alphabetical order.

4. The one or more non-transitory computer readable media of claim 1, wherein the operations further comprise:

executing a first sorting operation on the target set of the plurality of version number values based on associated standardized numerical version numbers;

subsequent to the first sorting operation, executing a second sorting operation on a subset of the target set of the plurality of version number values, with the same associated standardized numerical version numbers, based on the non-numerical components of each of the subset of the target set of the plurality of version number values.

5. The one or more non-transitory computer readable media of claim 1, wherein the plurality of version number values include numerical portions and non-numerical portions, wherein numerical portions include one or more numbers and do not include any letters, wherein non-numerical portions include one or more letters and zero or more numbers.

6. The one or more non-transitory computer readable media of claim 1, wherein the operations further comprise:

identifying the numerical version numbers specified by the plurality of version number values, wherein identifying the numerical version numbers comprises:

generating training data for an entity tagging model, wherein the training data comprises:

(a) actual values, and (b) entity tags corresponding to the actual values;

training the entity tagging model using the training data; and applying the entity tagging model to the plurality of version number values to identify numerical version numbers and non-numerical components of the plurality of version number values.

7. The one or more non-transitory computer readable media of claim 1, wherein the standardization function is selected based on a format of the numerical version numbers specified by the plurality of version number values, wherein numerical version numbers having multiple decimal points are standardized by:

a. identifying a number of segments defined by the multiple decimal points;

b. identifying a maximum number of digits in each segment; and c. padding segments of the number of segments with leading zeroes such that number of digits in each segment is equal to the maximum number of digits for the segment.

8. A method comprising:

receiving an instruction to execute an operation on a target set of software instances with corresponding version number values that meet a particular criteria, wherein the particular criteria defines a first numerical criterion and a non-numerical criterion;

applying a standardization function to a numerical version number specified by the first numerical criterion to determine a second numerical criterion specifying a target standardized numerical version number;

accessing a plurality of version number values corresponding respectively to a plurality of software instances;

applying the standardization function to numerical version numbers specified by the plurality of version number values to determine standardized numerical version numbers associated with the plurality of version number values;

filtering the plurality of version number values based on the second numerical criterion and the non-numerical criterion to determine a target set of the plurality of version number values that meet the second numerical criterion and the non-numerical criterion, wherein version number values, of the plurality of version number values, with (a) associated standardized numerical version numbers that meet the second numerical criterion and (b) non-numerical components that meet the non-numerical criterion are included in the target set of the plurality of version number values;

including software instances, of the plurality of software instances, that are associated with one of the target set of the plurality of version number values in the target set of software instances; and executing the operation on the target set of software instances, wherein the method is performed by at least one device including a hardware processor.

9. The method of claim 8, further comprising:

executing a first sorting operation on the plurality of version number values based on associated standardized numerical version numbers;

subsequent to the first sorting operation, executing a second sorting operation on a subset of the plurality of version number values, with the same associated standardized numerical version numbers, based on the non-numerical components of each of the subset of the plurality of version number values.

10. The method of claim 9, wherein the second sorting operation comprises:

identifying pre-release versions, release versions, and patches associated with version number values of the subset of the plurality of version number values;

arranging the subset of the plurality of version number values with any pre-release versions listed in alphabetical order, followed by any release versions listed in alphabetical order, followed by any patches listed in alphabetical order.

11. The method of claim 8, further comprising:

executing a first sorting operation on the target set of version number values based on associated standardized numerical version numbers;

subsequent to the first sorting operation, executing a second sorting operation on a subset of the target set of the plurality of version number values, with the same associated standardized numerical version numbers, based on the non-numerical components of each of the subset of the plurality of version number values.

12. The method of claim 8, wherein the plurality of version number values include numerical portions and non-numerical portions, wherein numerical portions include one or more numbers and do not include any letters, wherein non-numerical portions include one or more letters and zero or more numbers.

13. The method of claim 8, further comprising:

identifying the numerical version numbers specified by the plurality of version number values, wherein identifying the numerical version numbers comprises:

generating training data for an entity tagging model, wherein the training data comprises:

(a) actual values, and (b) entity tags corresponding to the actual values;

training the entity tagging model using the training data; and applying the entity tagging model to the plurality of version number values to identify numerical version numbers and non-numerical components of the plurality of version number values.

14. The method of claim 8, wherein the standardization function is selected based on a format of the numerical version numbers specified by the plurality of version number values, wherein numerical version numbers having multiple decimal points are standardized by:

a. identifying a number of segments defined by the multiple decimal points;

b. identifying a maximum number of digits in each segment; and c. padding segments of the number of segments with leading zeroes such that number of digits in each segment is equal to the maximum number of digits for the segment.

15. A system comprising:

at least one device including a hardware processor;

the system being configured to perform operations comprising:

receiving an instruction to execute an operation on a target set of software instances with corresponding version number values that meet a particular criteria, wherein the particular criteria defines a first numerical criterion and a non-numerical criterion;

applying a standardization function to a numerical version number specified by the first numerical criterion to determine a second numerical criterion specifying a target standardized numerical version number;

accessing a plurality of version number values corresponding respectively to a plurality of software instances;

applying the standardization function to numerical version numbers specified by the plurality of version number values to determine standardized numerical version numbers associated with the plurality of version number values;

filtering the plurality of version number values based on the second numerical criterion and the non-numerical criterion to determine a target set of the plurality of version number values that meet the second numerical criterion and the non-numerical criterion, wherein version number values, of the plurality of version number values, with (a) associated standardized numerical version numbers that meet the second numerical criterion and (b) non-numerical components that meet the non-numerical criterion are included in the target set of the plurality of version number values;

including software instances, of the plurality of software instances, that are associated with one of the target set of the plurality of version number values in the target set of software instances; and executing the operation on the target set of software instances.

16. The system of claim 15, wherein the operations comprise:

executing a first sorting operation on the plurality of version number values based on associated standardized numerical version numbers;

subsequent to the first sorting operation, executing a second sorting operation on a subset of the plurality of version number values, with the same associated standardized numerical version numbers, based on the non-numerical components of each of the subset of the plurality of version number values.

17. The system of claim 16, wherein the second sorting operation comprises:

identifying pre-release versions, release versions, and patches associated with version number values of the subset of the plurality of version number values;

arranging the subset of the plurality of version number values with any pre-release versions listed in alphabetical order, followed by any release versions listed in alphabetical order, followed by any patches listed in alphabetical order.

18. The system of claim 17, wherein the operations further comprise:

executing a first sorting operation on the target set of the plurality of version number values based on associated standardized numerical version numbers;

subsequent to the first sorting operation, executing a second sorting operation on a subset of the target set of the plurality of version number values, with the same associated standardized numerical version numbers, based on the non-numerical components of each of the subset of the target set of the plurality of version number values.

19. The system of claim 16, wherein the plurality of version number values include numerical portions and non-numerical portions, wherein numerical portions include one or more numbers and do not include any letters, wherein non-numerical portions include one or more letters and zero or more numbers.

20. The system of claim 16, wherein the operations further comprise:

identifying the numerical version numbers specified by the plurality of version number values, wherein identifying the numerical version numbers comprises:

generating training data for an entity tagging model, wherein the training data comprises:

(a) actual values, and (b) entity tags corresponding to the actual values;

training the entity tagging model using the training data; and applying the entity tagging model to the plurality of version number values to identify numerical version numbers and non-numerical components of the plurality of version number values.

21. The system of claim 16, wherein the standardization function is selected based on a format of the numerical version numbers specified by the plurality of version number values, wherein numerical version numbers having multiple decimal points are standardized by:

a. identifying a number of segments defined by the multiple decimal points;

b. identifying a maximum number of digits in each segment; and c. padding segments of the number of segments with leading zeroes such that number of digits in each segment is equal to the maximum number of digits for the segment.

* * * * *